US012316435B2

(12) United States Patent
Wu et al.

(10) Patent No.: US 12,316,435 B2
(45) Date of Patent: May 27, 2025

(54) PASSIVE BACKSCATTERING BEAMFORMER BASED ON LARGE-AREA ELECTRONICS

(71) Applicant: The Trustees of Princeton University, Princeton, NJ (US)

(72) Inventors: Can Wu, Palo Alto, CA (US); Yue Ma, Princeton, NJ (US); Naveen Verma, Princeton, NJ (US); James Sturm, Princeton, NJ (US); Sigurd Wagner, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 211 days.

(21) Appl. No.: 17/993,168

(22) Filed: Nov. 23, 2022

(65) Prior Publication Data
US 2024/0313857 A1  Sep. 19, 2024

Related U.S. Application Data

(60) Provisional application No. 63/284,551, filed on Nov. 30, 2021.

(51) Int. Cl.
*H04B 7/22* (2006.01)
(52) U.S. Cl.
CPC ..................... *H04B 7/22* (2013.01)
(58) Field of Classification Search
CPC ....... H04B 7/22; H04B 10/548; H04L 27/106; H01Q 1/2225; H01Q 15/14;
(Continued)

(56) References Cited

U.S. PATENT DOCUMENTS

| 7,528,728 B2 * | 5/2009 | Oliver ............... G06K 19/0723 340/572.8 |
| 2007/0176824 A1 * | 8/2007 | Stumbo .................. H01Q 3/34 342/372 |

(Continued)

FOREIGN PATENT DOCUMENTS

CN         111564702 B  *  7/2021  ............. H01Q 15/14

OTHER PUBLICATIONS

Su et al. "Demonstration of radio-frequency response of amorphous IGZO thin film transistors on the glass substrate", Solid-State Electronics, 2015, pp. 122-125. (Year: 2015).*
(Continued)

*Primary Examiner* — Sophia Vlahos
(74) *Attorney, Agent, or Firm* — Withrow & Terranova, PLLC

(57) ABSTRACT

Systems and methods disclosed herein provide for a passive backscattering beamformer based on large-area electronics (LAE). Low power is critical for distributed nodes in future IoT/5G networks. A key emerging solution is using ubiquitous 2.4 GHz Wi-Fi infrastructure with passive backscattering nodes, for low-power communication. LAE enables monolithic integration of devices over large and flexible substrates, with recent advances into the gigahertz regime opening new opportunities for wireless systems. An LAE passive backscattering beamformer is chosen that is capable of (1) enhancing the backscattered signal power in a scalable manner enabled by LAE's monolithic integrability over meter-scale area; (2) configuration between constructive/destructive beamforming; (3) frequency-shift keying for data modulation and SNR enhancement, by shifting the signal away from the incident interferer; and (4) frequency division multiplexing for increasing data bandwidth.

23 Claims, 10 Drawing Sheets

(58) Field of Classification Search
CPC .. H01Q 21/0006; H01Q 3/2647; H01Q 21/00; H01Q 3/2605; H01Q 3/36; H01Q 3/2611
See application file for complete search history.

(56) References Cited

U.S. PATENT DOCUMENTS

| | | | | |
|---|---|---|---|---|
| 2009/0134461 | A1* | 5/2009 | Nagasawa | G02F 1/133555 257/350 |
| 2010/0086070 | A1* | 4/2010 | Ishii | H04B 7/0814 375/260 |
| 2022/0255587 | A1* | 8/2022 | Dunna | H04W 52/0203 |

OTHER PUBLICATIONS

Belo, D. et al., "IQ Impedance Modulator Front-End for Low-Power LoRa Backscattering Devices," IEEE Transactions on Microwave Theory and Techniques, vol. 67, Issue 12, IEEE, pp. 5307-5314.

Kellogg, B. et al., "Wi-fi backscatter: internet connectivity for RF-powered devices," ACM SIGCOMM Computer Communication Review, vol. 44, Issue 4, Oct. 2014, 12 pages.

Liu, V. et al., "Ambient backscatter: wireless communication out of thin air," ACM SIGCOMM Computer Communication Review, vol. 43, Issue 4, Oct. 2013, first published Aug. 2013, 12 pages.

Mehlman, Y. et al., "Gigahertz Zinc-Oxide TFT-Based Oscillators," Proceedings of the 77th Annual Device Research Conference (DRC), Jun. 2019, pp. 63-64.

Meng, M. et al., "12.2 Improving the Range of WiFi Backscatter Via a Passive Retro-Reflective Single-Side-Band-Modulating MIMO Array and Non-Absorbing Termination," 2021 IEEE International Solid-State Circuits Conference (ISSCC), vol. 64, Feb. 2021, pp. 202-204.

Sharp, E.D. et al., "Van Atta reflector array," IRE Transactions on Antennas and Propagation, vol. 8, Issue 4, Jul. 1960, IEEE, pp. 436-438.

Trotter, M.S. et al., "Multi-antenna techniques for enabling passive RFID tags and sensors at microwave frequencies," 2012 IEEE International Conference on RFID (RFID), Apr. 2012, 7 pages.

Wu, C. et al., "Gigahertz Large-Area-Electronics RF Switch and its Application to Reconfigurable Antennas," 2020 EEE International Electron Devices Meeting (IEDM), Dec. 2020, San Francisco, CA, USA, IEEE, 4 pages.

* cited by examiner

PASSIVE BACKSCATTERING BEAMFORMER BASED ON LARGE-AREA ELECTRONICS

RELATED APPLICATION

This application claims the benefit of U.S. Provisional Application Ser. No. 63/284,551, filed Nov. 30, 2021, the disclosure of which is hereby incorporated herein by reference in its entirety.

GOVERNMENT SUPPORT

This invention was made with government funds under Agreement No. HR0011-18-3-0004 awarded by the Defense Advanced Research Projects Agency (DARPA). The U.S. government has certain rights in this invention.

FIELD OF THE DISCLOSURE

The present disclosure is related to passive backscattering beamforming based on large-area electronics.

BACKGROUND

Low-power requirements and wide-scale deployment of future Internet of Things (IoT) and/or Fifth Generation (5G) networks motivate passive backscattering nodes that can piggyback on ubiquitous 2.4 GHz Wi-Fi signals in the environment. As depicted in the backscattering system 100 in FIG. 1A, using a Wi-Fi access point 104 as a base station to communicate with a backscattering IoT node 102, a key challenge is low return signal power due to the $1/d^4$ Friis path loss ($1/d^2$ path loss for both incoming signal 106 and backscattered signal 108), limiting Signal to Noise Ratio (SNR) and communication distance.

SUMMARY

Systems and methods disclosed herein provide for a passive backscattering beamformer based on large-area electronics. Low power is critical for distributed nodes in future IoT/5G networks. A key emerging solution is using the ubiquitous 2.4 GHz Wi-Fi infrastructure with passive backscattering nodes, for low-power communication. The main challenge is low SNR and short communication distance with backscattering. This is overcome by introducing beamforming using large-area electronics (LAE) technology to achieve adequate and scalable aperture size. LAE enables monolithic integration of devices over large and flexible substrates, with recent advances into the gigahertz regime opening new opportunities for wireless systems. An LAE passive backscattering beamformer is chosen that is capable of (1) enhancing the backscattered signal power in a scalable manner, enabled by LAE's monolithic integrability over meter-scale areas; (2) configuring between constructive and destructive beamforming; (3) frequency-shift keying for data modulation and SNR enhancement, by shifting the signal away from the incident interferer; and (4) frequency division multiplexing for increasing data bandwidth.

To address the challenges, a retroreflective beamforming technique has been proposed as shown in FIG. 1B, which steers a directional beam 110 back to the incident source, regardless of the incident beam angle. This enhances signal power quadratically with aperture size L, via increased number of antenna elements and thus antenna directionality. Its implementation requires an array of antennas (with typical spacing $\sim\lambda/2$, where $\lambda=12.5$ cm at 2.4 GHZ) and correspondingly distributed RF switches. The signal power of the backscattered beam benefits from both the large aperture size L and high directionality (narrow beamwidth), increasing SNR by $L^2$.

In an embodiment, a backscattering beamforming device can include an array of antenna pairs. The device can also include a plurality of switching nodes, wherein each switching node comprises four thin-film transistor switches, wherein each antenna pair of the array of antenna pairs is coupled to a switching node via transmission lines, and wherein a switching node of the plurality of switching nodes is configured to switch each antenna of an antenna pair between a first transmission line with a first phase delay, and a second transmission line with a second phase delay. The device can also include a controller that is configured to adjust one or more configurations of each of the four thin-film transistor switches of each switching node to perform modulation of transmissions backscattered from the array of antenna pairs.

In another embodiment, a method of operation of a backscattering beamforming device can include beamforming a backscattered transmission incident on an array of antenna pairs by configuring each of four thin-film transistor switches of a plurality of switching nodes associated with respective antenna pairs of the array of antenna pairs to a first configuration. The method can also include frequency shift keying the backscattered transmission incident on the array of antenna pairs adjusting each of the four thin-film transistor switches between a second and third configuration, wherein the second configuration has transmission lines to a first antenna at a first phase delay, and the third configuration has transmission lines to a second antenna at a second phase delay 180 degrees different than the first phase delay. Toggling between these configurations effectively leads to multiplication of the backscattered signal by an amount determined by the phase delays, yielding frequency modulation at the toggling frequency.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
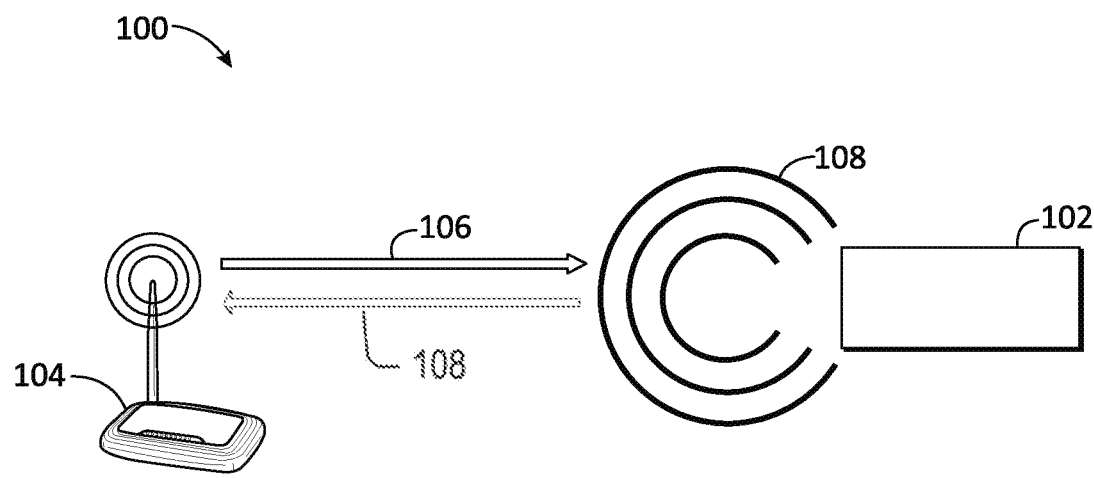
FIG. 1A is a schematic diagram of a conventional backscattering wireless system.
Figure 1B:
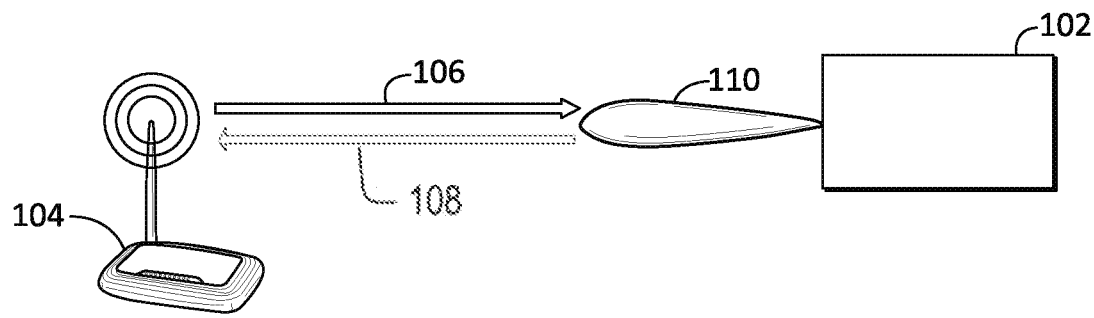
FIG. 1B is a schematic diagram of a proposed backscattering beamformer based on LAE technology according to one or more embodiments of the subject disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Systems and methods disclosed herein provide for a passive backscattering beamformer based on large-area electronics (LAE). Low power consumption is critical for distributed nodes in future Internet of Things (IoT) and/or Fifth Generation Third Generation Partnership Project (3GPP) networks. A key emerging solution is using ubiquitous 2.4 GHz Wi-Fi infrastructure with passive backscattering nodes, for low-power communication. The main challenge is low signal to noise ratio (SNR) and short communication distance with backscattering. This is overcome by introducing beamforming using LAE technology to achieve adequate and scalable aperture size. LAE enables monolithic integration of devices over large and flexible substrates, with recent advances into the gigahertz regime opening new opportunities for wireless systems. An LAE passive backscattering beamformer is chosen that is capable of (1) enhancing the backscattered signal power in a scalable manner enabled by LAE's monolithic integrability over meter-scale areas; (2) configuration between constructive/destructive beamforming; (3) frequency-shift keying for data modulation and SNR enhancement, by shifting the signal away from the incident interferer; and (4) frequency division multiplexing for increasing data bandwidth.

For increasing the aperture L, today's systems require assembling discrete components, limiting scalability, cost, and reliability. To overcome this, LAE can be utilized which enables monolithic meter-scale and flexible fabrication on a single substrate (~3×~3 $m^2$ as in today's flat-panel display manufacture).

As used herein, LAE devices are a new format of electronics, that include printed, flexible, organic and/or bioelectronic devices that are enabled by new materials that can be processed at low temperatures. LAE devices permit the use of new manufacturing processes such as printing and digital fabrication for electronics and enable products with new form factors, new cost structures and the potential for customization. LAE approaches can produce ultrathin, lightweight, flexible, and rollable devices that: emit or reflect light for displays, lighting, and smart windows; transduce light for sensing and photovoltaic energy generation; sense a variety of physical, chemical, and biological parameters; form flexible or stretchable circuits for analogue and digital electronics; harvest and/or store energy. Emerging LAE technologies include electronics for smart textiles and bio-electronics for a new class of wearable and implantable devices.

While LAE devices have previously been limited to low speeds, typically below megahertz, recent work has brought LAE to the gigahertz regime via large-area compatible device optimization. Here these advanced LAE devices are exploited, i.e., radio-frequency (RF) switches, and their design is tailored to a backscattering system, for enabling the first monolithically-integrable backscattering operation.

Backscattering is a method of communication in which a non-powered communication device (e.g., a radio-frequency identification tag) without a battery (or any internal power source) receives energy from a reader or base station's transmission and uses that same energy to send back a response. The backscattering device receives the energy via electromagnetic waves propagated from the reader/base station. Once the waves reach the backscattering device, the energy travels through the backscattering device's internal antenna(s), and activates integrated-circuit chip(s). The remaining energy is modulated with the chip's data and flows back via the backscattering device's antenna to the reader's or base station's antenna in the form of electromagnetic waves from a beamformer operating in any frequency band, including the 2.4 GHz Wi-Fi frequency band.

Figure 2A:
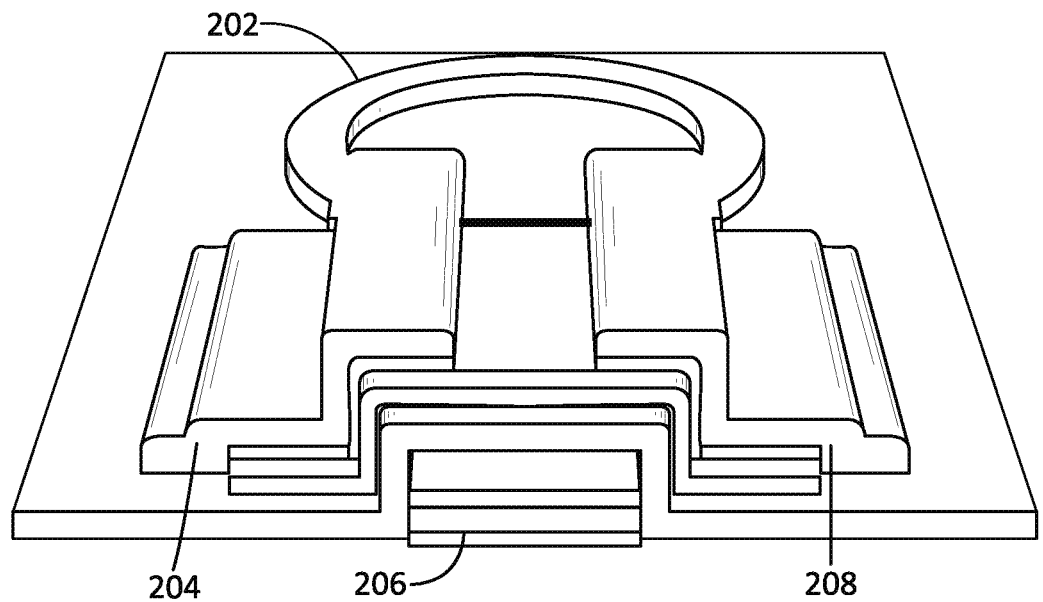
FIG. 2A and 2B are schematic diagrams of an LAE resonant Radio Frequency (RF) switch according to one or more embodiments of the subject disclosure.
Figure 2B:
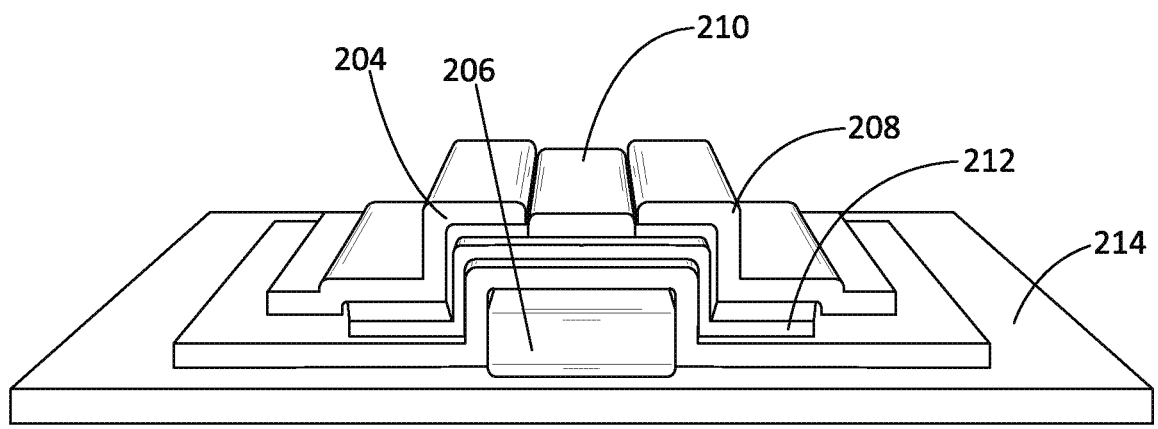

FIG. 2A and 2B are schematic diagrams of an LAE resonant RF switch according to one or more embodiments of the subject disclosure. The switch in FIG. 2A and 2B can enable functionality to perform backscattering and frequency shift keying of the backscattering device as described herein. In an embodiment, the switch can be based on a Zinc Oxide (ZnO) thin-film transistor (TFT). The critical design goals are to maximize off-to-on impedance ratio ($|Z_{OFF}(\omega)/Z_{ON}(\omega)|$), while ensuring adequate system efficiency and bandwidth (e.g., 100 MHz for 2.4 GHz Wi-Fi signals).

To boost the off-state impedance $|Z_{OFF}|$, a resonant operation is utilized by introducing an LAE inductor 202 in parallel with TFT, which cancels out the TFT parasitic source/drain-to-gate overlap capacitances $C_{GS}/C_{GD}$ formed by the source 204, gate 206, and drain 208 of the switch. This leverages the high inductor quality factor Q enabled by the large dimensions, thick metal, and low-loss (insulating) substrates of LAE technology.

FIG. 2B shows another cross section of the LAE resonant RF switch. A passivation layer 210 can be formed in between the source 204 and the drain 208. The passivation layer 210 can be $Al_2O_3$ and have a thickness of around 35 nm in an embodiment. A gate dielectric 214 can also be $Al_2O_3$, and have a thickness of around 40 nm. The source 204 and drain 208 can be formed from a bilayer, consisting of titanium with a thickness of around 40 nm and gold with a thickness of around 50 nm. The gate 206 can be a stack of chromium (~10 nm), aluminum (~110 nm), and chromium (~40 nm). While an active layer 212 can be formed from ZnO and have a thickness of around 10 nm.

Figure 3:
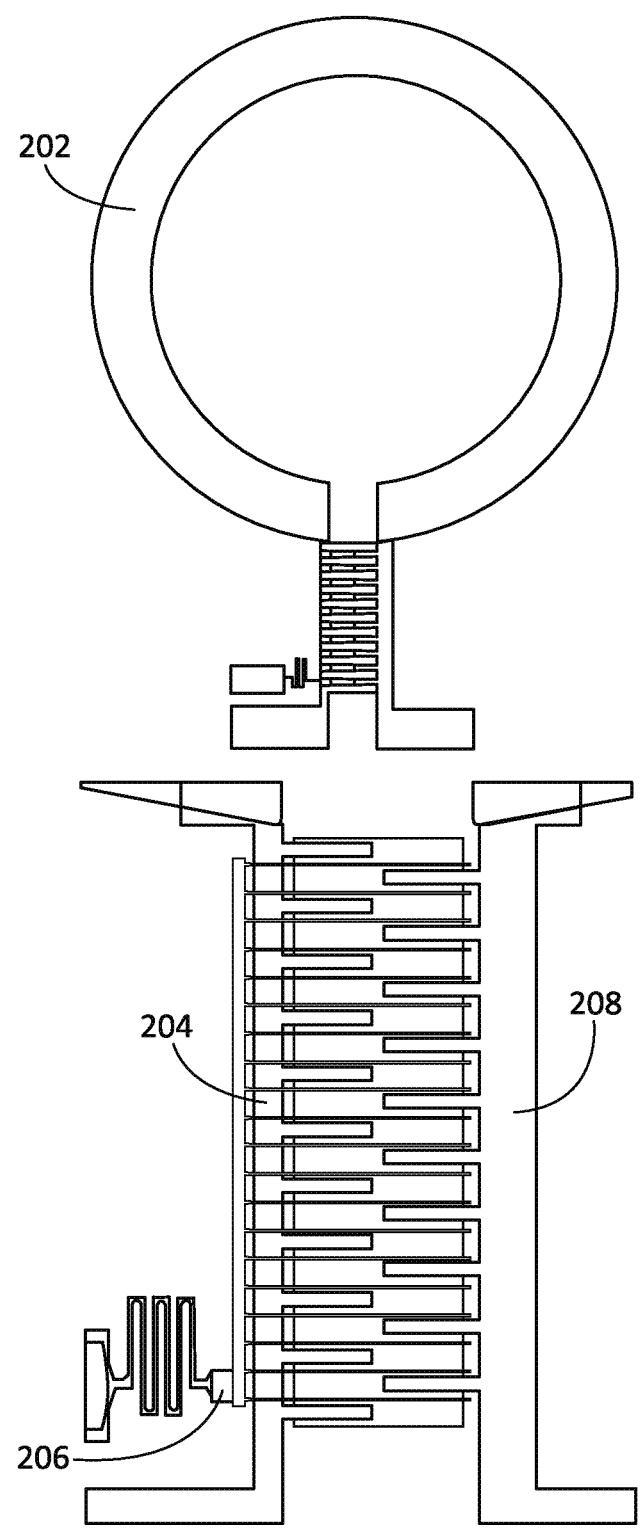
FIG. 3 is an illustration of an integrated LAE resonant RF switch, according to one or more embodiments of the subject disclosure.

As shown in FIG. 3, the RF switches are fabricated at flex-compatible temperature (<200° C.), but on glass to facilitate prototype system assembly and testing via dicing and wire bonding. In other implementations, such switches can be monolithically fabricated on a single substrate. The TFTs have W/L of 3000 μm/1.1 μm; the integrated planar loop inductor 202 of the RF switch can be made of 2.5 μm-thick Au with a radius of 830 μm (inductance of ~2.8 nH). A ~20 kΩ resistor made of thin-film Cr in series with the gate 206 serves to: (1) isolate the gate-biasing traces from creating parasitic RF paths; and (2) protect the TFTs from ESD damage. This results in an RC time constant for switch toggling of ~260 ns from charging/discharging the gate capacitor, which translates to modulation rates for the backscatterer in the range of megahertz. For wireless sensing applications, this yields sufficient data rates, which, if desired, can be raised by replacing the resistor with an inductor of similar impedance.

Figure 5A:
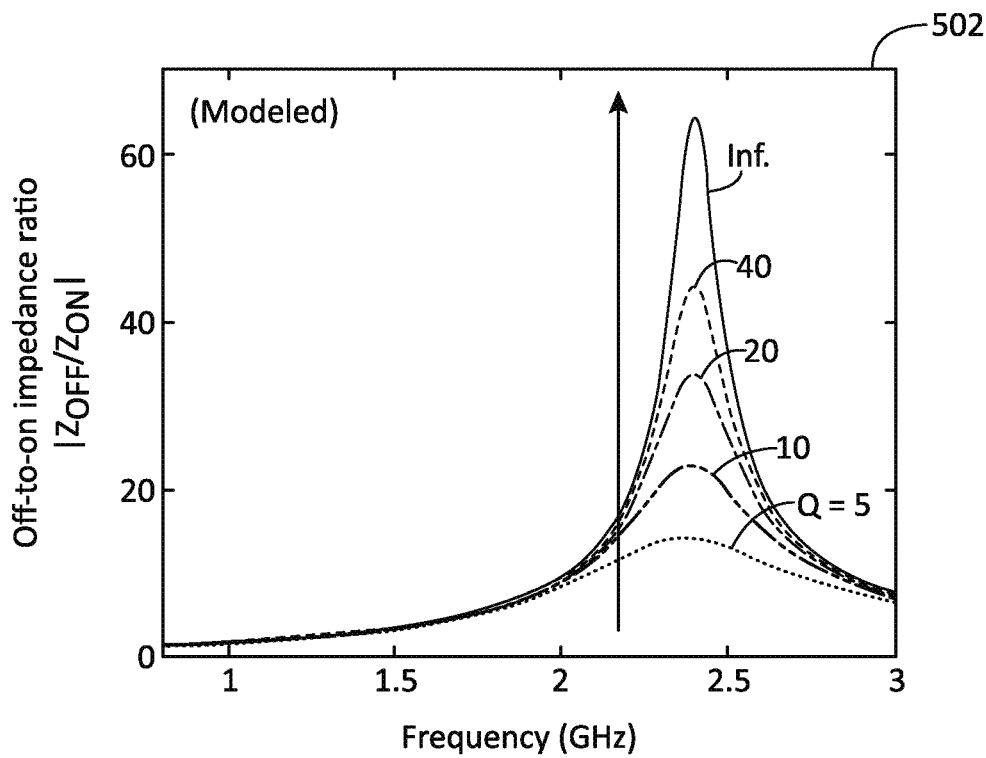
FIG. 5A is a graphical representation of off-to-on impedance ratio for the LAE resonant RF switch according to one or more embodiments of the present disclosure.

As shown in FIG. 5A, the resonant operation effectively trades off bandwidth for increased $|Z_{OFF}|$ as can be seen in graph 502. This tradeoff is useful, because low-power RF systems typically operate in a narrow band for energy efficiency.

Figure 4A:
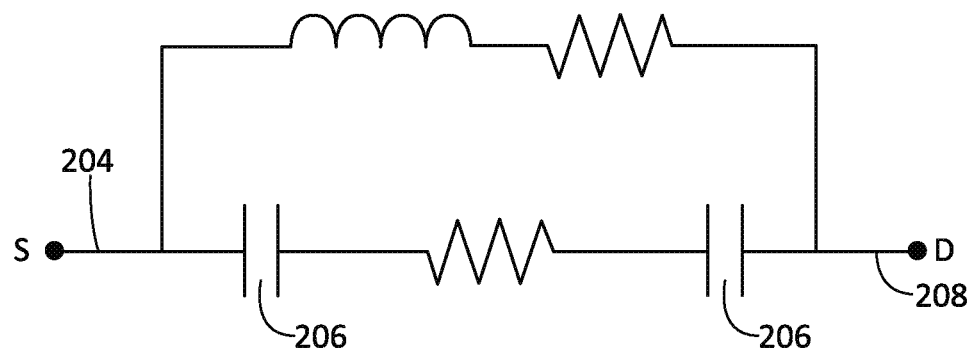
FIG. 4A and 4B are circuit-model diagrams of the LAE resonant RF switch in different configurations according to one or more embodiments of the subject disclosure.
Figure 4B:
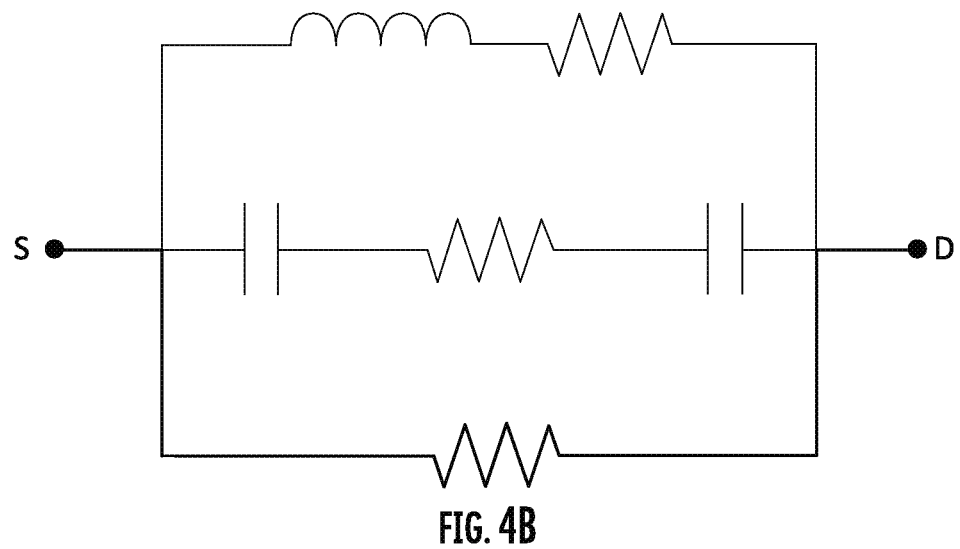
Figure 5B:
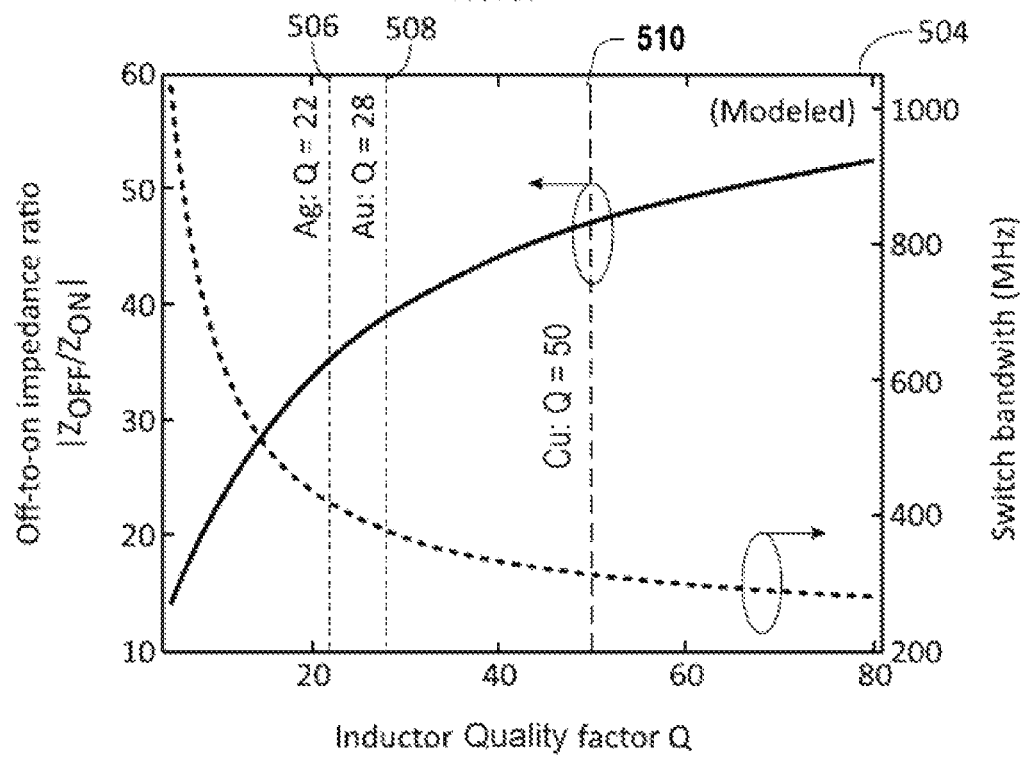
FIG. 5B is a graphical representation of off-to-on impedance ratio at the resonant frequency and switch half-bandwidth as a function of inductor quality factor for the LAE resonant RF switch according to one or more embodiments of the present disclosure.

The model of FIGS. 4A and 4B where the switch is in an OFF state in FIG. 4A and in an ON state in FIG. 4B suggests that, once the TFT channel length is set (i.e., minimized), at the target resonant frequency $\omega$, $|Z_{OFF}(\omega)/Z_{ON}(\omega)|$ and bandwidth become solely dependent on the inductor quality factor Q. In FIG. 5B, the impedance ratio is plotted and switch bandwidth as a function of Q. Beyond Q=40, the improvement of $|Z_{OFF}/Z_{ON}|$ is marginal. FIG. 5B also highlights three quality factors of ~28 (508), ~22 (506), and 50 (510) achieved using 2.5 μm-thick gold silver, and 35 μm-thick copper, respectively.

Figure 6A:
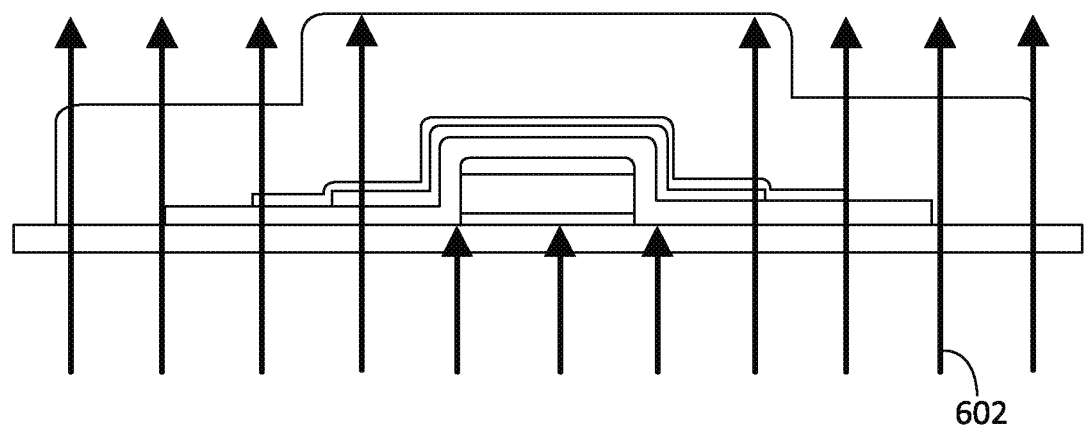
FIG. 6A is a cross-sectional schematic diagram of thin-film transistor (TFT) Source/Drain (S/D) metal patterning according to one or more embodiments of the present disclosure.
Figure 6B:
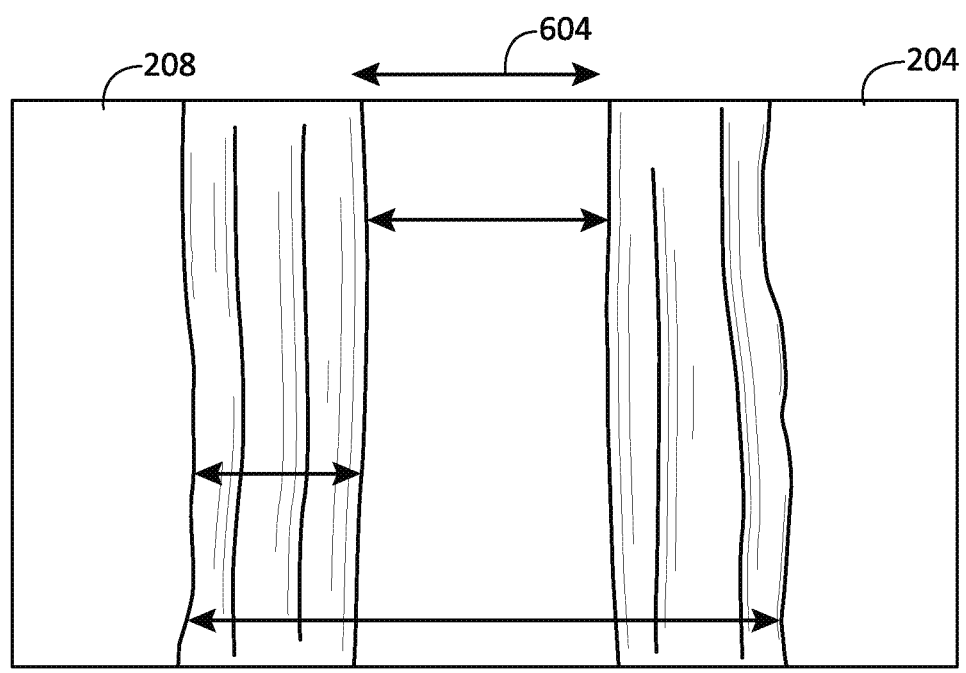
FIG. 6B is an illustration a TFT channel region according to one or more embodiments of the present disclosure.

To minimize the on-state impedance $|Z_{ON}|$, a short TFT channel is required. This can be achieved via a self-aligned process (FIGS. 6A and 6B), where TFT's source and drain are defined by the gate electrode via UV 602 exposure from the backside. In this scheme, UV light diffraction creates a source/drain-to-gate overlap $L_{OV}$ of ~0.5 μm, which reduces the channel length to $2L_{OV}$ less than the smallest feature size of the LAE lithography. As shown in FIG. 6B, a channel length 604 between drain 208 and source 204 of ~0.7 μm can be reliably achieved, well below that typical of TFTs used in today's displays (e.g., ~3 μm).

Figure 7A:
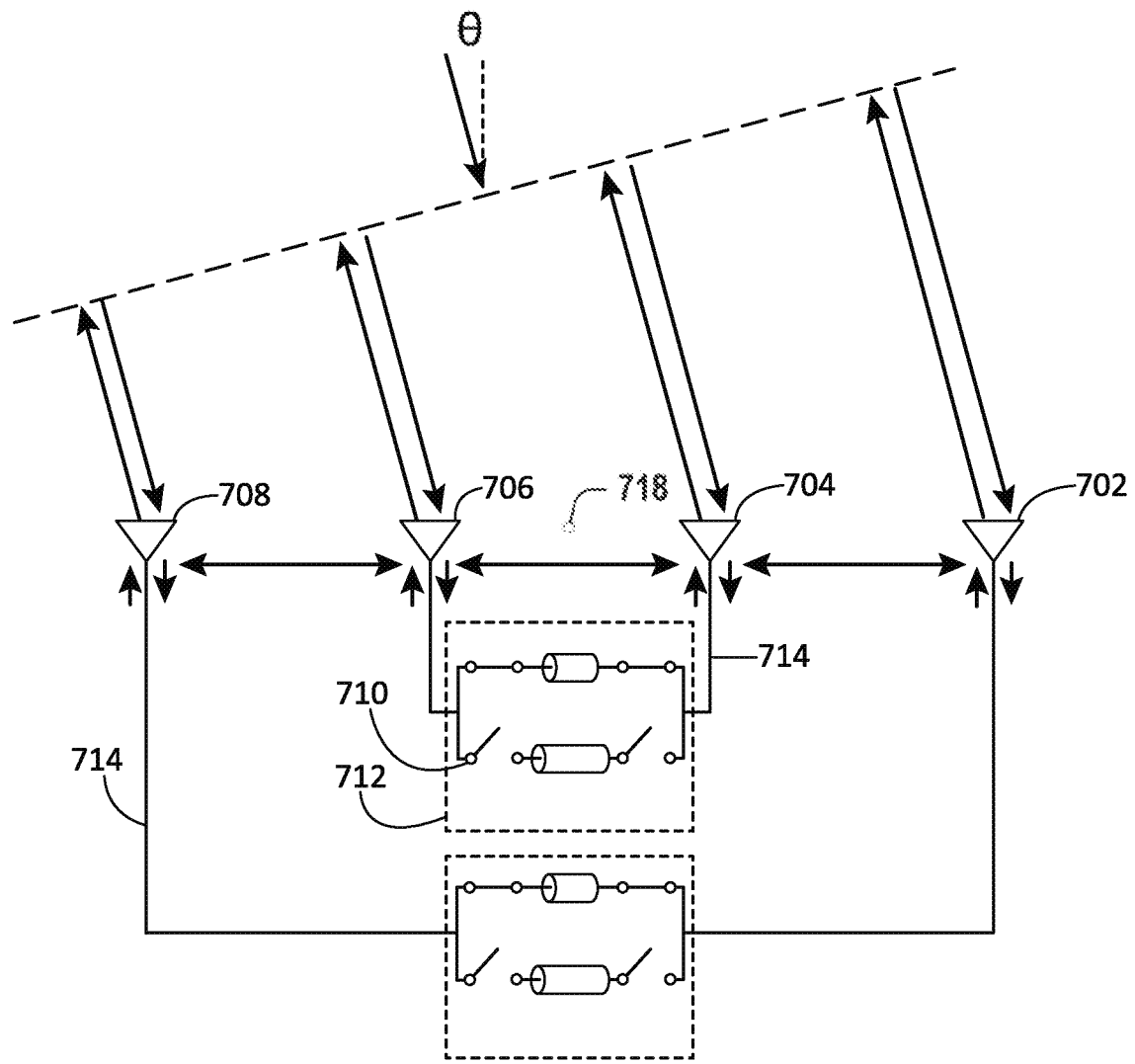
FIG. 7A is a system diagram of a backscattering beamformer under constructive beamforming according to one or more embodiments of the present disclosure.
Figure 7B:
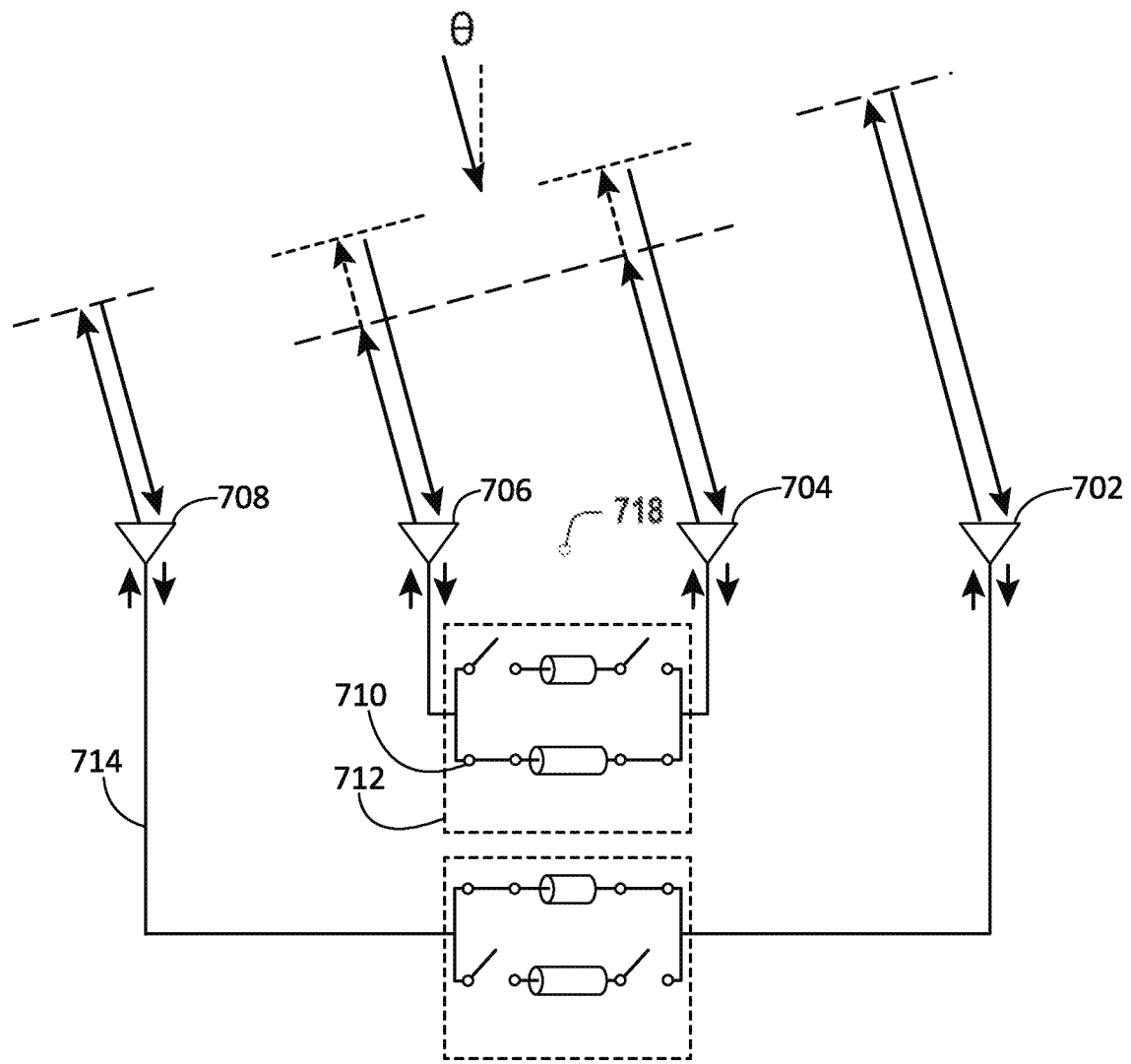
FIG. 7B is a system diagram of the backscattering beamformer under destructive beamforming according to one or more embodiments of the present disclosure.

FIGS. 7A and 7B show the system architecture of the backscattering beamformer. Extending the concept of a Van Atta array, the system consists of an array of antenna pairs (702 and 708; 704 and 706). In an embodiment, the antennas can be spaced at a distance apart of λ/2, where 1 is the wavelength of the RF transmission being utilized by the backscattering beamformer. For example, in an embodiment, for a backscattering beamformer that is tuned to operate in a 2.4 GHz band, the wavelength distance can be roughly 12.5 cm, with the antennas spaced approximately 6.25 cm apart from each other. In another embodiment, the antennas 702-708 can be arranged centro-symmetrically with respect to an origin point (O) 718. For each pair of antennas (e.g., 706 and 704), a switching node 712 can be provided that has 4 RF switches (e.g., 710) that can be configured into a variety of configurations to perform beamforming by adjusting the length of a transmission line 714 to each antenna of the antenna pair. By adjusting the length of the transmission line, the path delay of the transmission line of each antenna can be manipulated to cause the antennas to be either in phase or out of phase with each other, thus configuring the antennas to perform constructive or destructive beamforming in the incident direction, for any arbitrary incident direction. The switching node 712 and switches 710 can also be manipulated to perform frequency-shift keying (FSK) by modulating the phase of the transmission. Each antenna can act as both a receiver and a transmitter.

As shown in FIG. 7A, beamforming is achieved by each pair of antennas towards a source in any arbitrary direction (θ). In the incident direction, the phase differences of the incident signal are exactly compensated by the phase differences of the return signals (i.e., path delays of the incident and return signals in the direction θ that are labeled as 0°, α, 2α, and 3α, where α=180°. sin θ). By connecting the pairs with transmission lines (e.g., 714) of equal phase delay, constructive beamforming in the incident direction θ is achieved across the entire array. Furthermore, as shown in FIG. 7B, transmission lines with phase delays differing by 180° Cause corresponding phase offset in the return signals, yielding destructive beamforming in the incident direction θ between the two pairs. RF switches to select between transmission lines with 0°/180° phase difference enable constructive and destructive beamforming configurability.

Figure 8:
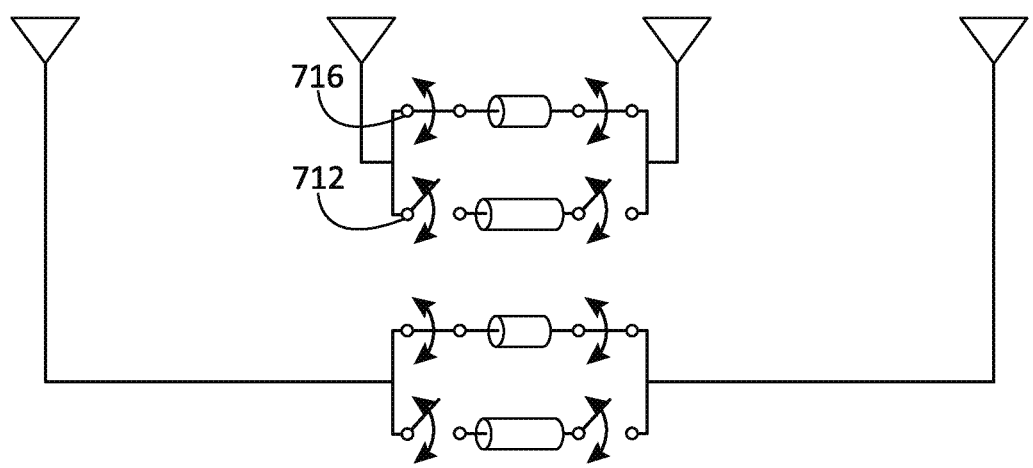
FIG. 8 is a schematic diagram of frequency-shift keying (FSK) according to one or more embodiments of the present disclosure.

The switches also enable frequency-shift keying (FSK), to modulate data for reliable transmission. As shown in FIG. 8, FSK is implemented by (1) configuring the switches (e.g., 710 and 716) for both antenna pairs to select phase-matched transmission lines, yielding constructive beamforming; and then (2) simultaneously toggling all switches between two transmission lines having phase difference of 180°, thereby maintaining matched phase across all pairs, but where the absolute phase of the return signals is modulated by 0° and 180°. This amounts to multiplication by a sequence of alternating 1 and −1. (1) The toggling frequency enables interference-free demodulation by shifting the data away from the large incident signal; and (2) FSK data (i.e., transmission of 0/1) is achieved by modulating at $\Delta f_1/\Delta f_2$ frequencies; and (3) multiple 0/1-data frequencies can be employed for increasing data bandwidth via frequency-division multiplexing (FDM).

The LAE resonant RF switches (e.g., 710 and 716) are designed to maximize beamforming efficiency across the 2.4 GHz Wi-Fi bandwidth (~100 MHz), while ensuring tolerance to intrinsic device variations in $C_{GD}$ and $C_{GS}$, which results in variation of the resonant frequency set by $1/2\pi [L_{IND} \cdot (C_{GS} \| C_{GD})]^{1/2}$. Given a measured $(C_{GS} \| C_{GD})$ standard deviation of ~185 fF, a 350-MHz switch bandwidth is chosen to cover the Wi-Fi band. This corresponds to a maximal inductor Q of 42 and thus a maximum off-to-on ratio of 45, as indicated by FIG. 5B.

The resulting impedance ratio ultimately sets the system efficiency. Mixer loss, which can dominate the system loss, scales with $|Z_{OFF}/Z_{ON}|$. As marginal reduction in loss is seen at ratios >20, a ratio of 40 is chosen as a maximum-ratio design target, allowing for half-ratio reduction over the required bandwidth.

Next, an optimal TFT width W is selected to minimize the mixer loss. Increasing W first reduces the loss owing to decreasing switch insertion loss, then raises it due to decreasing switch isolation. The optimal width is 3000 μm.

In an embodiment, a peak $|Z_{OFF}/Z_{ON}|$ of 38 with a half bandwidth of ~400 MHz is achieved, thus covering the 2.4 GHz band of interest.

During a trial of a test system performing frequency shift keying, using Δf=75 kHz, two peaks were clearly observed in constructive mode at $f_B \pm \Delta f$ ($f_B$ in 2.4-2.5 GHz Wi-Fi band). Switching to destructive mode reduces the signal power by >20 dB. Further measurements confirmed the constructive and destructive beamforming for arbitrary incident angles θ, by measuring the signal power while rotating the backscatterer (effectively sweeping θ). A difference of >20 dB between two modes across 108° Coverage was achieved. Outside this range, the difference decreases due to roll-off of the antenna directivity away from broadside.

Figure 9:
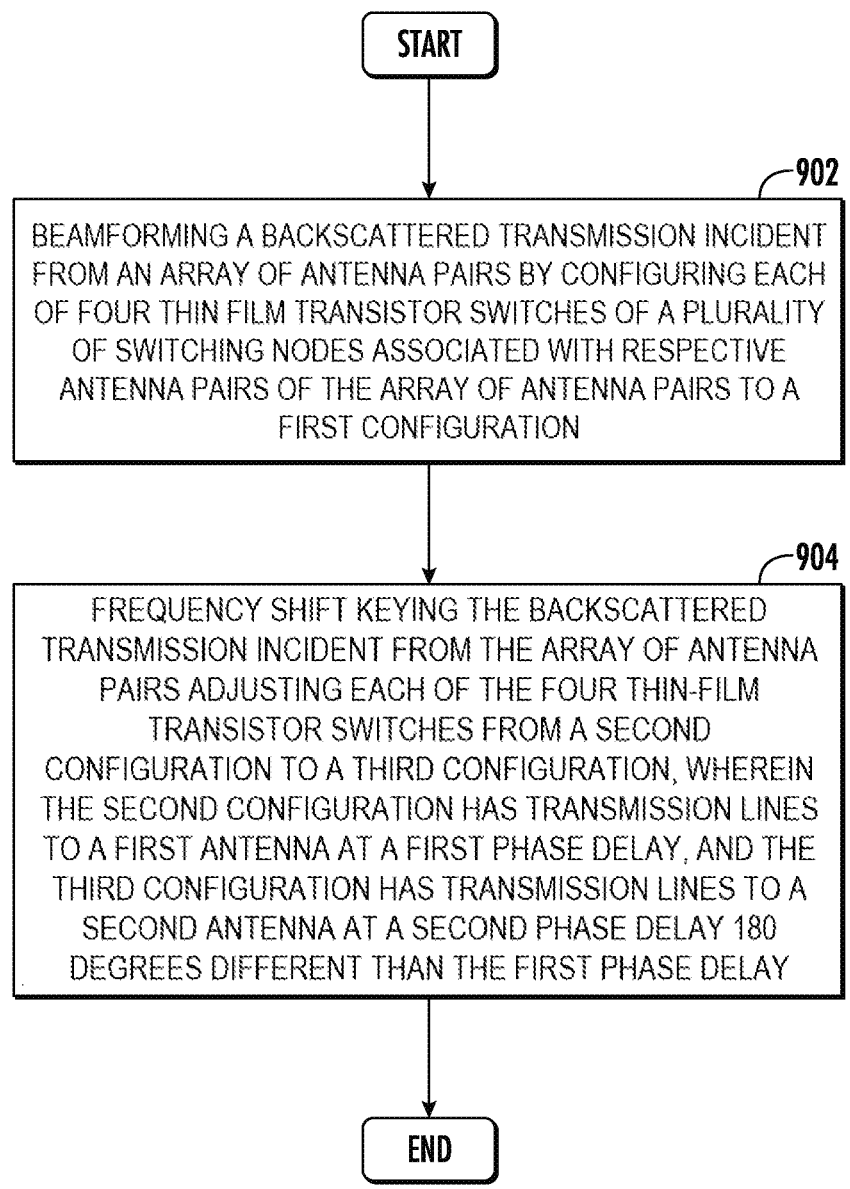
FIG. 9 is a flowchart of a method of operation of a backscattering beamforming device according to one or more embodiments of the present disclosure.

FIG. 9 illustrates a flowchart of a method of operation of a backscattering beamforming device according to one or more embodiments of the present disclosure.

The method can start at 902 where the method includes beamforming a backscattered transmission incident from an array of antenna pairs by configuring each of four thin-film transistor switches of a plurality of switching nodes associated with respective antenna pairs of the array of antenna pairs to a first configuration.

In an embodiment, the antenna pair can be arranged centro-symmetrically with respect to an origin point.

In an embodiment, the backscattering beamforming device is tuned to a particular frequency band and corresponding wavelength, and wherein the antennas of the antenna array are spaced apart from each other at a distance of half of a wavelength at the operation frequency.

In an embodiment, a channel of a thin-film transistor switch of the four thin-film transistor switches is defined by exposure with ultraviolet light on a back side of the thin-film transistor switch. In an embodiment, diffraction of the ultraviolet light creates a source/drain-to-gate overlap $L_{ov}$ of ~0.5 μm. In another embodiment, a channel length of the thin-film transistor switch is less than the smallest feature size of LAE lithography by $2L_{ov}$.

At 904, the method can include frequency shift keying the backscattered transmission incident from the array of antenna pairs adjusting each of the four thin-film transistor switches from a second configuration to a third configuration, wherein the second configuration has transmission lines to a first antenna at a first phase delay, and the third configuration has transmission lines to a second antenna at a second phase delay 180 degrees different than the first phase delay.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein.

What is claimed is:

1. A backscattering beamforming device, comprising:
   an array of antenna pairs;
   a plurality of switching nodes, wherein each switching node comprises four thin-film transistor switches, wherein each antenna pair of the array of antenna pairs is coupled to a switching node via transmission lines, and wherein a switching node of the plurality of switching nodes is configured to switch each antenna of an antenna pair between a first transmission line with a first phase delay, and a second transmission line with a second phase delay; and
   a controller that is configured to adjust one or more configurations of each of the four thin-film transistor switches of each switching node to perform beamforming and frequency shift keying of transmissions backscattered from the array of antenna pairs.

2. The backscattering beamforming device of claim 1, wherein the second phase delay is 180 degrees different than the first phase delay.

3. The backscattering beamforming device of claim 1, wherein the array of antenna pairs is arranged centro-symmetrically with respect to an origin point.

4. The backscattering beamforming device of claim 1, wherein the backscattering beamforming device is tuned to a particular frequency band and corresponding wavelength, and wherein the antennas of the antenna array are spaced apart from each other at a distance of half of a wavelength at the operation frequency.

5. The backscattering beamforming device of claim 4, wherein the wavelength is 12.5 centimeters.

6. The backscattering beamforming device of claim 1, wherein the controller adjusts each of the four thin-film transistor switches of each switching node to a first predefined configuration to beamform a transmission backscattered from the array of antenna pairs.

7. The backscattering beamforming device of claim 1, wherein the controller changes each of the four thin-film transistor switches from a first predefined configuration to a second predefined configuration to perform frequency shift keying of a transmission backscattered from the array of antenna pairs.

8. The backscattering beamforming device of claim 1, wherein the backscattering beamforming device is a large-area electronics device.

9. The backscattering beamforming device of claim 1, wherein an antenna of the antenna pair is coupled to a thin-film transistor switch of the thin-film transistor switches in parallel.

10. The backscattering beamforming device of claim 1, wherein a channel of a thin-film transistor switch of the four thin-film transistor switches is defined by exposure with ultraviolet light from the back side of the thin-film transistor switch.

11. The backscattering beam forming device of claim 1, wherein the switching nodes are fabricated on a substrate comprising the array of antenna pairs.

12. The backscattering beam-forming device of claim 1, where the switching nodes are fabricated on a substrate a same size as the antennas.

13. The backscattering beam forming device of claim 11, wherein the substrate is at least one of a flexible substrate, glass, plastic, metal foil, or a non-crystalline substrate.

14. The backscattering beamforming device of claim 10, wherein diffraction of the ultraviolet light creates a Source/Drain to Gate overlap $L_{ov}$ of ~0.5 µm.

15. The backscattering beamforming device of claim 14, where a channel length of the thin-film transistor switch is less than $2L_{ov}$.

16. A method of operation of a backscattering beamforming device, comprising:
    beamforming a backscattered transmission incident from an array of antenna pairs by configuring each of four thin-film transistor switches of a plurality of switching nodes associated with respective antenna pairs of the array of antenna pairs to a first configuration; and
    frequency shift keying the backscattered transmission incident from the array of antenna pairs adjusting each of the four thin-film transistor switches from a second configuration to a third configuration, wherein the second configuration has transmission lines to a first antenna at a first phase delay, and the third configuration has transmission lines to a second antenna at a second phase delay 180 degrees different than the first phase delay.

17. The method of claim 16, wherein the array of antenna pairs is arranged centro-symmetrically with respect to an origin point.

18. The method of claim 16, wherein the backscattering beamforming device is tuned to a particular frequency band and corresponding wavelength, and wherein the antennas of the antenna array are spaced apart from each other at a distance of half of a wavelength at an operation frequency.

19. The method of claim 16, wherein the backscattering beamforming device is a large-area electronics device.

20. The method of claim 16, wherein an antenna of the antenna pair is coupled to a thin-film transistor switch of the thin-film transistor switches in parallel.

21. The method of claim 16, wherein a channel of a thin-film transistor switch of the four thin-film transistor switches is defined by exposure with ultraviolet light on a back side of the thin-film transistor switch.

22. The method of claim 21, wherein diffraction of the ultraviolet light creates a Source/Drain to Gate overlap $L_{ov}$ of 0.5 µm.

23. The method of claim 22, where a channel length of the thin-film transistor switch is less than $2L_{ov}$.

* * * * *